United States Patent [19]

Thompson

[11] Patent Number: 4,709,577
[45] Date of Patent: Dec. 1, 1987

[54] SYSTEM FOR CONTINUOUSLY MONITORING FOR LEAKS IN UNDERGROUND STORAGE TANKS

[75] Inventor: Glenn M. Thompson, Tucson, Ariz.

[73] Assignee: Tracer Research Corporation, Tucson, Ariz.

[21] Appl. No.: 556,620

[22] Filed: Nov. 29, 1983

[51] Int. Cl.$^4$ .............................................. G01M 3/20
[52] U.S. Cl. ...................................... 73/40.7; 73/49.2; 422/83; 436/3; 436/56
[58] Field of Search .................. 73/40.7, 40.5 R, 49.2; 47/48.5, DIG. 4, DIG. 10; 222/478; 239/50; 422/70, 83, 265; 436/3, 25, 27–30, 161, 56, 175; 44/59

[56] References Cited

U.S. PATENT DOCUMENTS

| | | | |
|---|---|---|---|
| 3,468,796 | 9/1969 | Noll et al. | 210/641 |
| 3,598,536 | 8/1971 | Christensen | 422/265 X |
| 3,749,646 | 7/1973 | Pirt | 210/644 X |
| 4,141,692 | 2/1979 | Keller | 44/59 |
| 4,181,702 | 1/1980 | Watson | 422/265 |
| 4,189,938 | 2/1980 | Heim | 73/40.7 |
| 4,446,329 | 5/1984 | Waller | 585/458 |
| 4,501,324 | 2/1985 | Sandiford et al. | 436/27 X |

FOREIGN PATENT DOCUMENTS

| | | | |
|---|---|---|---|
| 1804441 | 5/1970 | Fed. Rep. of Germany | 73/49.2 |
| 54-150195 | 11/1979 | Japan | 436/161 |

OTHER PUBLICATIONS

Randall et al.; Suitability of Fluorocarbons as Tracers in Ground Water Resources Evaluation; Selected Water Resources Abstracts; PB277488; 11/77.
Ferger et al.; Demonstration of a Long-Range Tracer System Using Perfluorocarbons; National Technical Information Services; 1/81.

Primary Examiner—Barry S. Richman
Assistant Examiner—Michael S. Gzybowski
Attorney, Agent, or Firm—Harry M. Weiss & Associates

[57] ABSTRACT

An apparatus and method for detecting leaks from underground gasoline storage tanks and the like by routine or periodic soil samples tested for a particular tracer. A fluorinated halocarbon compound tracer having a boiling point less than that of gasoline is slowly dispensed within the gasoline, natural gas, or the like in the tank. A sampling pipe having a plurality of apertures therein is also buried in selected locations in the vicinity of the tank, and samples of the soil gas are pumped from the pipe and supplied to a Nafion water separator prior to analysis by gas chromatographic techniques. If a leak in the tank should occur, the tracer will exit with the leaking gasoline, quickly vaporize, and travel rapidly by molecular diffusion in all directions. Elements of the tracer will therefore be detected in the soil gas pumped from the sample pipe using standard gas chromatography techniques, indicating that a leak exists in the tank.

12 Claims, 3 Drawing Figures

SYSTEM FOR CONTINUOUSLY MONITORING FOR LEAKS IN UNDERGROUND STORAGE TANKS

BACKGROUND OF THE INVENTION

This invention relates generally to a soil gas monitoring system and method and, more particularly, to an essentially passive, leak detection apparatus and method which relies primarily on diffusion to move a predetermined tracer from the leak point to the monitoring point for detecting fluid leaks from subsurface storage tanks such as buried gasoline or natural gas storage tanks which are monitored on a substantially regular schedule to test subsurface tank integrity even though no evidence indicates that a leak may exist.

The prior art is replete with systems for detecting leaks from liquid storage tanks. Some liquid leak monitoring systems utilize tank liners and sensors to detect leaks of the stored liquid or gaseous product. Unfortunately, installation of such a system at an existing service station or the like would require the digging out and removal of the existing subsurface tanks, thus resulting in extremely high installation costs and a disruption of the service station operation. Other devices that sense liquid level in the tank often require the tank to be out of service for 12 hours or more.

In other known underground liquid monitoring systems, monitoring points are established at locations lower in elevation than the buried tank and directly in the path of escaping liquid. Such systems often take the form of monitoring wells at the water table surface and usually require substantial digging. Unfortunately, such systems have a low probability of success, and leaks are generally only detected after a large amount of liquid product has escaped.

It is a standard in the oil industry to employ pressure test methods to detect leaks in buried tanks. However, such methods are usually only employed after a leak is suspected and not on a regularly scheduled or periodic basis. Such tests are very expensive (believed to cost $4,000 to $5,000 per test), and they interrupt normal operation of the tank. As a result, pressure testing is not performed on a frequent or routine basis.

Therefore, there is a long-felt and unfilled need in the prior art for a relatively low cost method and apparatus for detecting gas leaks in underground or subsurface gasoline or natural gas tanks by a monitoring system which enables leak checking or testing periodically or on a regular schedule, which detects even relatively small amounts of escaped gas or gasoline, and which does not require extensive digging or the disruption of normal service station operation.

SUMMARY OF THE INVENTION

It is the object of the present invention to provide an improved soil gas monitoring apparatus and method.

It is a further object of the present invention to provide an improved apparatus for detecting leaks from subsurface fluid storage tanks.

It is a still further object of the present invention to provide an improved apparatus and method for detecting leaks in buried gasoline tanks.

It is another object of the present invention to provide a low cost, essentially passive, leak detection system for use in conjunction with buried gasoline tanks.

It is yet another object of the present invention to provide an improved tracer injector or dispenser for a periodically monitored leak detection system.

A still further object of the present invention is to provide a leak detection method and apparatus for detecting leaks in buried gasoline tanks which can be implemented at new or existing service stations without requiring tank removal or disruption of tank service.

Yet another object of the present invention is to provide a leak detection method and apparatus for detecting leaks from buried gasoline tanks and for identifying which in any other of a plurality of tanks are leaking.

According to another aspect of the invention, there is provided an apparatus for detecting leaks from at least one subsurface fluid storage tank including means for dispensing a tracer into the fluid, at least one subsurface sampling pipe having a plurality of apertures therein, and means for analyzing samples of soil gas from the sampling pipe for the presence of the tracer indicative of a leak from the fluid tank.

According to a further aspect of the invention, there is provided a method for detecting leaks from a subsurface fluid storage tank by dispensing a tracer into the fluid contained in the fluid storage tank, sampling soil gas in at least one location in the vicinity of the tank, and analyzing the soil gas samples for detecting the presence of the tracer indicative of a fluid leak in the storage tank.

BRIEF DESCRIPTION OF THE DRAWINGS

The above, and other objects, features and advantages of the present invention will be more clearly understood from the following detailed description of the preferred embodiment taken in conjunction with the appended claims and the accompanying drawings which are described briefly hereinbelow.

DESCRIPTION OF THE PREFERRED EMBODIMENT

Figure 1:
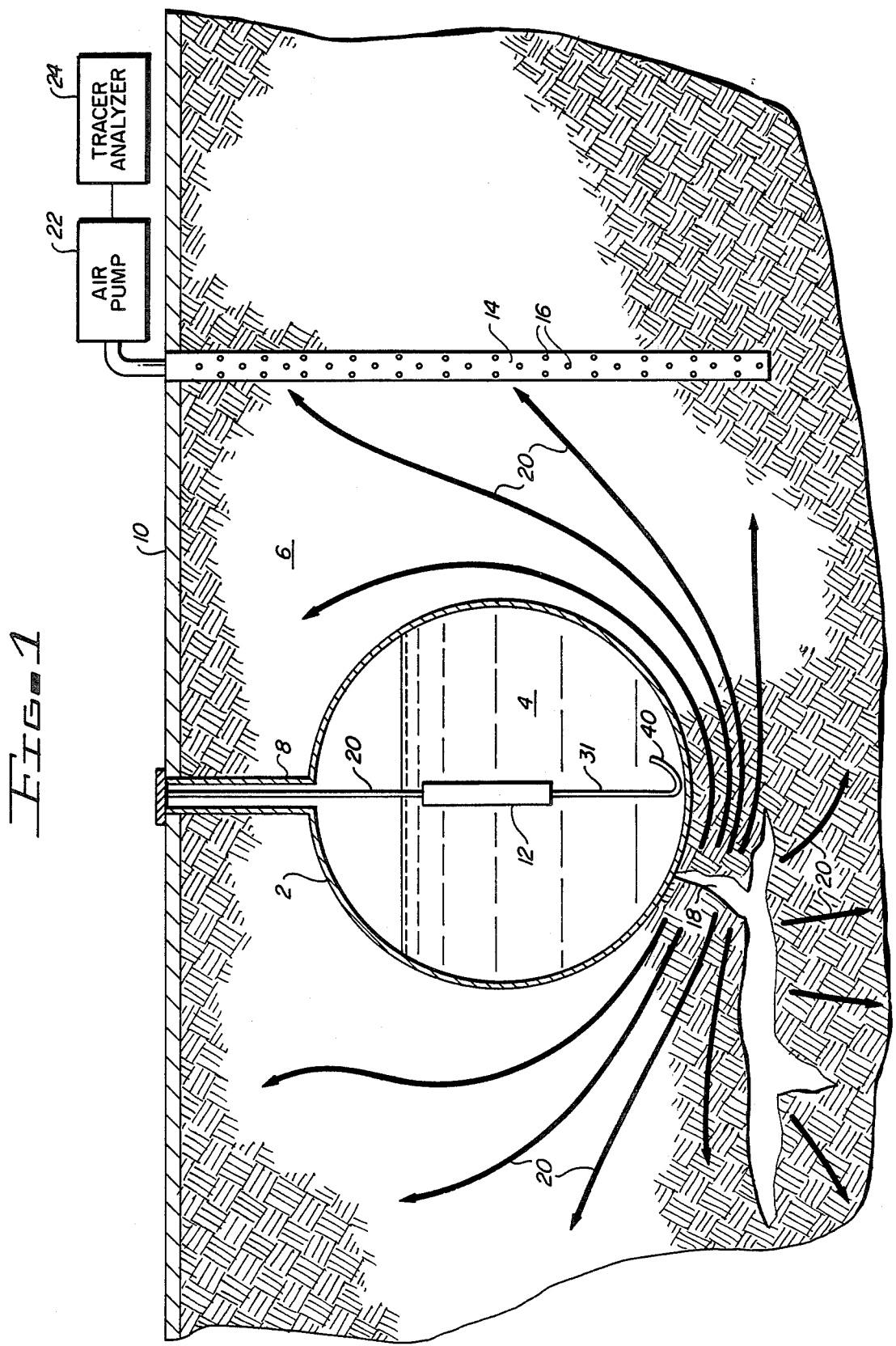
FIG. 1 is a cross-sectional functional diagram of the leak-monitoring system of the present invention.

Referring to FIG. 1 of the drawings, a buried tank 2 for storing a fluid, which may be, for example, a liquid such as gasoline 4 or a gas such as natural gas, methane, propane, butane, and the like, is surrounded by backfill 6, such as gravel, sand, earth, or the like. As can be seen, an inlet portion 8 of the tank 2 extends up to and through the surface 10 which may be, for example, pavement, concrete, asphalt, earth, or the like. A tracer-dispensing apparatus or device 12 is submerged or suspended in gasoline 4. One or more soil gas sampling pipes 14, each containing a plurality of breathing apertures, holes, or perforations 16, are installed at one or more strategic locations around the buried tank or tanks being monitored for leaks. For simplicity, only one storage tank 2 and one sampling pipe 14 have been shown in the drawing, but it is to be understood that a plurality of one or both can be used with the present invention.

Figure 3:
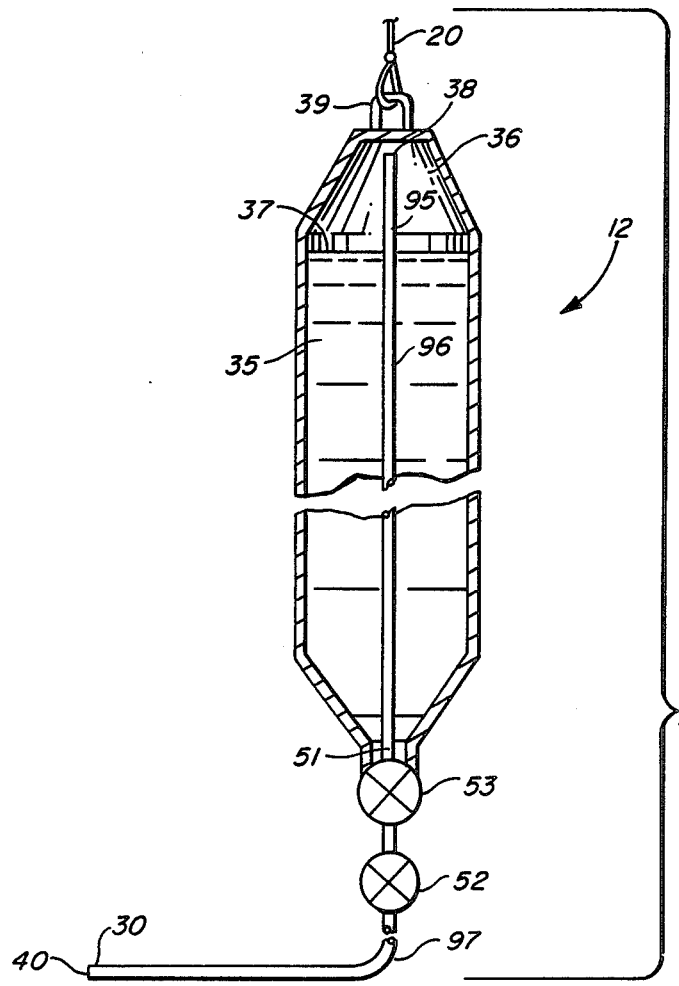
FIG. 3 is a partially sectional functional diagram of the tracer dispenser 12 of the system of FIG. 1.

The tracer-dispensing apparatus or device 12 of FIG. 1 will be further described with respect to FIGS. 1 and 3. Two configurations of tracer dispensers 12 are described with the present leak-monitoring system. The choice of dispenser configuration for a given situation is dependent on the particular tracer used. A first one of the tracer dispenser configurations is designed for, and is unique to the leak detection system of the present invention while a second configuration is less important but is useful where the selected tracer does not diffuse readily through the walls of the Teflon tube 31, and both are described with reference to FIG. 3.

In the first configuration of the dispenser 12, a length of FEP or PTFE Teflon tubing (10–40 ft. long), although rubber, silicone rubber, or plastic can also be used depending on the tracer type and fluid being traced. The tube is attached to a steel cylinder 32 (one to three liters) that acts as a reservoir 33 to hold tracer and it may be suspended in the tank as by a cable 20 or the like. The Teflon or silicone rubber tubing functions as a membrane surface that is permeable to the tracer in the first configuration. The tracer is released or dispensed from the device by diffusing it through the walls of the Teflon tubing 95 which is normally sealed by a plug 30 at the lower end thereof. The upper portion and intermediate portion 95, 96, respectively, of the tube 31 is not present in the first or preferred configuration of the dispenser 12. The tracer simply excits the outlet 51 as liquid phase and generally fills the lower tube portion 97 from which it enters the fluid in the tank 2 by diffusion through the walls of the lower tube portion 97. The lower tubing, generally designated tubing 97, provides a convenient membrane shape that needs no mechanical support and will release tracer along substantially its entire length.

Furthermore, having the tubing portion 97 extend through substantially the entire inside length of the tank 2 aids in distributing the tracer throughout the gasoline 4 or other liquid or gas in the tank 2. The rate of tracer release is a function of the tubing length, wall thickness, temperature, and tracer-diffusion coefficient through the Teflon in configuration 1. Diffusion through tubing is used to dispense the tracer because this provides a simple means of controlling a relatively slow release rate for a compatible tracer. Once the release rate per unit length of tube is determined, the desired release rate is achieved by adjusting the length of the tube portion 97.

Teflon is a fluorocarbon compound, and as such, other fluorocarbons, diffuse faster through it than non-fluorinated chemicals. Thus the rate of gasoline or gas movement into the dispenser by back diffusion is much more limited. In the first dispenser configuration of FIG. 3, the rate valve 53 and on/off valve 52 are eliminated. The reservoir 33 holds liquid tracer 35 in the lower portion and a gaseous tracer 36 in the upper end portion of the reservoir 33. The pressure in the tracer injector is the vapor pressure of tracer at the existing temperature and the liquid-gas tracer interface is at 37. A loop-like handle or hanger 39 can be used for suspending the dispenser 12 in the tank 2 as from cable 20 or the like.

The second type of dispenser configuration is well-known in the art and includes a pressurizable cylinder 32 that houses tracer 35 that is released through opening or outlet 51 and the rate of release is controlled by valves 52, 53 at the lower outlet end of the dispenser 12. A shutoff valve 52 for selectively turning the flow of tracer on and off is operably disposed proximate the outlet 51 and a second regulator valve 53 for selectively adjusting the tracer release rate is disposed proximate the outlet 51 either upstream or downstream from the shutoff valve 52.

The second dispenser may be used for tracers that are not compatible with the apparatus of the first configuration. More particularly, the second dispenser may be advantageously used for tracers that do not diffuse readily through the tubing of the first or preferred dispenser.

In the second configuration, the tube portion 97 is not plugged at the lower end 40, and is used only to conduct the tracer, either in liquid or gaseous phase, to the proper release point within storage tank 2. In the second configuration tube portions 95, 96 are present only if the tracer is to be released through valves 53 and 52 via outlets 51 in the gaseous phase. Tubing 95, 96 is, therefore, used effectively to extend opening 51 up to position 38 in the gas phase 36 of the tracer in the reservoir 35. If tracer is to be released in the liquid phase through outlet 51 and valves 53 and 52, upper and intermediate tube portions 95, 96 are omitted.

Tracer dispenser 12 contains a highly detectable volatile organic tracer such as a fluorocarbon compound, which has a boiling point typically, but not necessarily, lower than the bulk of the gasoline or other liquid or gas in tank 2. The boiling point of the tracer is typically between plus 80 degrees centigrade and minus 50 degrees centigrade. If liquid should leak into the soil or backfill 6, such as is shown at leak 18, the tracer, which is the most volatile component of the liquid in the tank 2, evaporates very quickly and moves by molecular diffusion in all directions into the soil gas as indicated by arrows 20.

Air samples are periodically pumped (on an appropriate monitoring schedule) from sample or collection pipe 14 by air pump 22 which has a pump input coupled to the outlet of the sample pipe 14 and a pump output coupled to a tracer analyzer 24 that includes a gas chromatograph which may be located in situ or remotely from air pump 22, as desired. The tracer is preferably detected by the tracer analyzer 24 using gas chromatography techniques.

Figure 2:
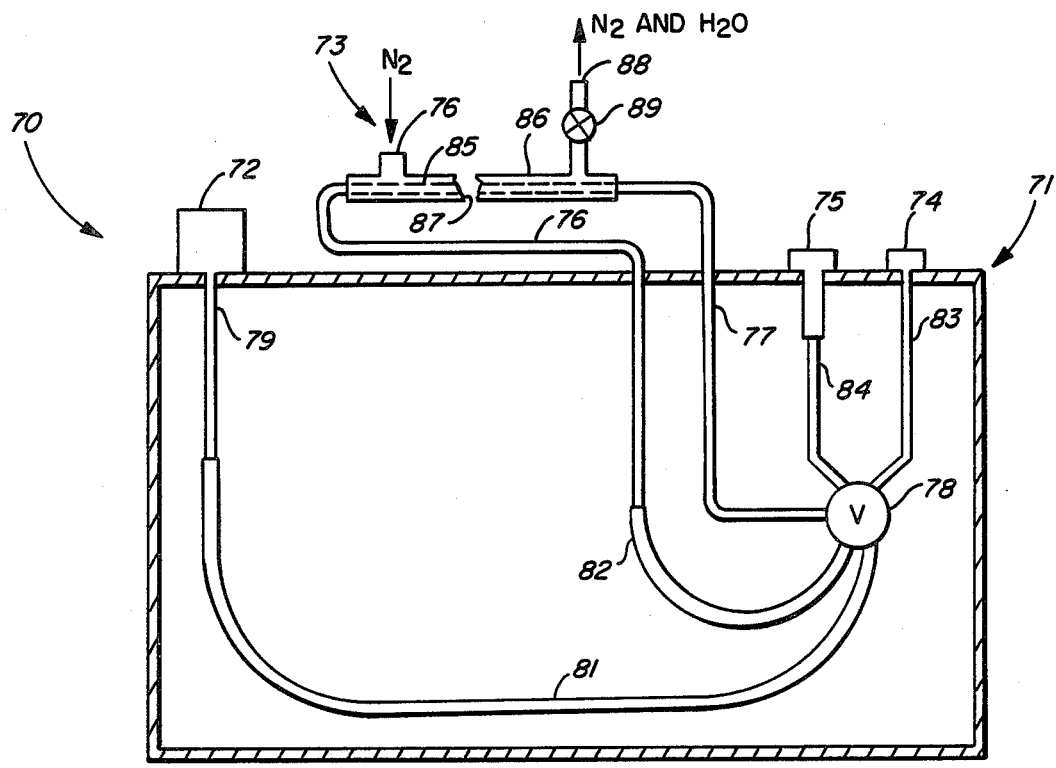
FIG. 2 is a functional diagram of the gas chromatograph and Nafion water separator of the tracer analyzer of FIG. 1.

The gas chromatograph itself is not unique to the present invention, and since it is well-known in the art, it needs no further description. However, the gas chromatograph 70 of the leak-monitoring system of the present invention uses an in-line Nafion tube as a water separator 73 of FIG. 2 which is needed to remove substantially all water vapor from the soil gas after the soil gas sample is injected into the gas chromatograph. The Nafion tube or device is described as "in-line" because it removes water from the soil gas samples as they flow through the chromatographic system. The entire chromatographic system into which the Nafion tube separator is incorporated is shown in FIG. 3 of my co-pending patent application Ser. No. 556,688 entitled "Rapid Leak Detection System", filed on even data herewith and which is expressly incorporated by reference herein.

The Nafion tube separator includes between 5 and 15 feet of 2 mm O.D. Nafion tubing 85, preferably about 10 feet encased within an annular stainless steel jacket or tube 86 for forming an annular return path or space 87 between tube and jacket.

The interior of the Nafion tube is continuous with the sample conducting tubing chromatograph system 70 to form an "in-line" system. The soil gas sample containing water vapor is injected into an inlet or input port 74 of the gas chromatograph where it is released into a carrier gas stream that sweeps it out of the gas chromatograph via connecting tube 77 and then through the Nafion tube 85 on the interior of the Nafion separator. The separator 73 includes Nafion tube 85 surrounded by a jacket of stainless steel 86 or the like to form an annular space or channel 86 between the inner tube 85 and the outer cylindrical jacket 86. The water in the form of water vapor diffuses through the walls of the Nafion tube 85 radially outward into the annular space 87, leaving the remaining soil gas sample behind in the inner Nafion tube. A nitrogen gas stream is supplied via inlet 98 to the annular space 87 to establish a flow stream which sweeps the water vapor or water through the annular space 87 and out the outlet or output 88 of the Nafion separator. With the water thus removed, the remaining soil gas sample continues inside the Nafion tube 85 and back via tube 76 into the precolumn 82 and the analytical column 81 to the electron capture device 72 of the chromatographic system 70. Thus the soil gas, without water, enters the system 70, facilitating the extremely sensitive measurement on the gas chromatograph.

The amount of tracer required by the system shown in the drawing of FIG. 1 is very small on a yearly basis; for example, only two to three liters of tracer per million gallons of gasoline at a typical gas station would be required. Thus, there is no measureable effect on the physical or chemical properties of the gasoline, and tracer cost is accordingly very low. A dispenser containing a one year supply of tracer can be installed in each underground tank, and the tracer can be easily detected in soil gas at extremely low (parts per trillion) concentrations. Thus, only a very small amount of tracer contained in the gasoline results in a highly detectable component of the soil gas. The fact that the tracer is not in the gasoline prior to it entering the tank eliminates the possibility of contaminating the surrounding area with tracer from gasoline surface spills which could then be confused as product leakage from the underground tank.

Monitoring or sampling may be performed at any desired frequency or time table, and preferably on a regular or periodic basis. If there is no reason to suspect a leak, a monthly check may be quite sufficient. Special checks can be made rapidly and easily when leaks are suspected. A number of different tracers may be utilized to permit the monitoring or leak testing of several tanks in close proximity to one another and provide the ability to distinguish which tank or tanks are leaking. Furthermore, a different tracer may be used for monitoring after a succession or undergound spills containing a previously used tracer has occurred to prevent repeated detection of the old spills or leaks.

As stated previously, most of the tracers which may be used as detectable in the low parts per trillion range in soil gas. Generally, fifty to one hundred parts per trillion of tracer is a sufficiently high concentration to identify and measure the tracer in even a rapid field analysis. Tests performed have shown that one hundred micrograms of tracer released underground have produced tracer quantities of at least two hundred parts per trillion in the soil gas at a distance of forty feet from the point of release. If the tracer concentration in the underground tank is maintained at one milligram of tracer per liter of gasoline, then a leak of one hundred milliliters of gasoline would release sufficient tracer to be detected in the soil gas at a distance of forty feet assuming that some pumping of the soil gas is performed at the time of sampling. Other variables such as the soil porosity, the permeability of the soil, and the leak location relative to the sample pipes may act to increase or decrease the estimated sensitivity. The above-described method offers a unique leak detection apparatus and method which employs the high detectability of flurocarbon tracers or the like.

In general, substantially all the volatile halocarbons that can be detected with great sensitivity by means of an electron capture detector 72 are suitable for this technique. The tracers that appear most suitable for use in the present invention are the chemical compounds known as fluorinated halocarbons, or more simply, fluorocarbons or halocarbons. These are preferable due to their low toxicity, volatility and absence from the natural background. Since the high volatility and diffusability through the Teflon dispenser are the basic desireable characteristics for a good tracer, the tracer list will include primarily one-carbon and two-carbon fluorinated compounds.

Compounds having a very high probability of success for use as tracers include the following:

A. Methanes including:
 (1) chlorobromodifluoromethane;
 (2) trifluoroiodomethane;
 (3) trifluorobromomethane;
 (4) dibromodifluoromethane;
 (5) dichlorodifluoromethane; and
 (6) tetrafluoromethane;

B. Ethanes including:
 (1) dichlorotetrafluoroethane;
 (2) chloropentafluorethane;
 (3) hexafluoroethane;
 (4) trichlorotrifluoroethane;
 (5) bromopentafluoroethane;
 (6) dibromotetrafluoroethane; and
 (7) tetrachlorodifluoroethane;

C. Others including:
 (1) sulferhexafluoride;
 (2) perfluorodecalin; and
 (3) perfluoro 1,3 dimethylcyclohexane.

Installation costs are limited to the purchase of the tracer dispenser and the installation of one or more sampling pipes around the buried tanks if they are not already present. The probability of detecting a leak is very high, since the tracer gas will diffuse very rapidly in all directions from the leak path and will soon intercept all monitoring points or gas sample pipes placed anywhere in the vicinity of the leak. Furthermore, this very reliable leak test can be performed on a regular basis without interfering with the use of the tank and without incurring significant expense.

The above description is given by way of example only. Changes in form and details may be made by one skilled in the art without departing from the spirit and scope of the present invention which is limited only by the appended claims.

I claim:

1. An apparatus for detecting leaks from at least one subsurface liquid storage tank comprising:
  at least one subsurface liquid storage tank containing a quantity of liquid;
  means for dispensing a highly detectable tracer into the liquid, wherein said dispensing means includes:
  an elongated generally cylindrical container means for storing at least a partial reservoir of liquid tracer and a portion of gaseous tracer and, an elongated permeation tube means extending downwardly from said container into said at least one subsurface liquid storage tank for diffusing the gaseous tracer through the walls of the permeation tube means for releasing tracer into the liquid in said tank;

at least one subsurface sampling pipe having a plurality of apertures therein for collecting soil gas samples near the proximity of said at least one subsurface liquid storage tank; and means for analyzing samples of soil gas from said at least one sampling pipe for detecting the presence of said tracer indicative of a liquid leak from said tank.

2. The apparatus of claim 1 wherein said dispensing means further includes means for operatively suspending said container within the liquid in said at least one subsurface liquid storage tank.

3. The apparatus of claim 1 wherein said permeation tube comprises natural rubber, synthetic rubber, TEFLON, plastic or silicone rubber.

4. The apparatus of claim 1 wherein said dispenser means includes means for shutting off the flow of tracer from the container.

5. The apparatus of claim 1 wherein the release rate may be selectively varied by varying the length of said permeation tube means extending from the outlet of said cylindrical container means.

6. The apparatus of claim 1 wherein said downwardly extending portion of said permeation tube means is operably extended through substantially the entire inside length of said, tank for aiding in distributing the tracer throughout the at least one subsurface liquid storage tank.

7. The apparatus of claim 6 wherein said permeation tube dispenses tracer throughout substantially its entire length.

8. The apparatus of claim 6 wherein said dispensing means includes a regulating means for selectively adjusting the tracer release rate from the container.

9. A system for monitoring for leaks from an underground tank containing a fluid to be stored, wherein the monitoring system can be sampled on a substantially regular periodic basis for leak testing, said monitoring system comprising, in combination:

dispensing means for controlled release of a tracer into a fluid in an underground tank, wherein said dispensing means includes:

container means forming a reservoir means for holding a tracer therein, said reservoir means containing a liquid phase of said tracer in a lower portion thereof and a gaseous phase of said tracer in an upper portion thereof, said container means further including a dispensing outlet in the lower end portion thereof, said dispensing means further includes an elongated permeation tube means having an extended portion, and tube walls for diffusing the tracer at a controllable constant rate into the fluid in said tank, said extended portion of said permeation tube means for (a) slowly releasing said tracer into the fluid in said tank through said tube walls, (b) extending substantially through the inside of the tank for aiding in distributing the tracer through the fluid in said tank, and (c) acting as an additional reservoir for containing gaseous state tracer;

at least one subsurface soil gas sampling pipe having a plurality of apertures in at least a lower portion thereof, said at least one pipe being operably disposable at a selected location adjacent to said tank;

means for drawing a soil gas sample through said at least one subsurface pipe; and analyzing means for detecting the presence of the tracer in the soil gas sample for indicating the existence of a leak in said tank.

10. The system of claim 9 wherein said dispensing means further includes first valve means operatively disposed at an output means of said container means for selectively adjusting the release rate of the tracer into the fluid and second valve means operatively disposed in said extended tube portion proximate said first valve means for selectively turning the tracer flow on and off.

11. The system of claim 10 wherein said dispensing means further includes means for operatively suspending said container means and said permeation tube means within an upper level of fluid within said tank.

12. The system of claim 11 wherein said permeation tube means comprises TEFLON, plastic, or rubber and includes an organic liquid sealed inside.

* * * * *